United States Patent
Ochab et al.

(10) Patent No.: US 6,622,837 B2
(45) Date of Patent: Sep. 23, 2003

(54) BI-DIRECTIONAL OVERRUNNING CLUTCH WITH AUTOMATIC BACKDRIVE

(75) Inventors: David C. Ochab, Horseheads, NY (US); Matthew J. Cowen, Elmira, NY (US); Kelly P. Heath, Corning, NY (US)

(73) Assignee: The Hilliard Corporation, Elmira, NY (US)

( * ) Notice: Subject to any disclaimer, the term of this patent is extended or adjusted under 35 U.S.C. 154(b) by 16 days.

(21) Appl. No.: 09/802,608

(22) Filed: Mar. 9, 2001

(65) Prior Publication Data

US 2002/0125095 A1 Sep. 12, 2002

Related U.S. Application Data

(60) Provisional application No. 60/249,617, filed on Nov. 17, 2000.

(51) Int. Cl.⁷ .............................................. F16H 48/16
(52) U.S. Cl. .............................. 192/35; 74/650; 192/38; 192/50; 192/87.11
(58) Field of Search .......................... 192/87.11, 221, 192/35, 38, 49, 50; 74/650

(56) References Cited

U.S. PATENT DOCUMENTS

| | | | |
|---|---|---|---|
| 1,823,389 A | 9/1931 | Lavaud | |
| 2,865,228 A | 12/1958 | Weismann | 74/650 |
| 3,124,972 A | 3/1964 | Seliger et al. | |
| 3,262,526 A | 7/1966 | Kramer | 192/38 |
| 3,447,396 A | 6/1969 | Seliger | 76/650 |
| 3,500,977 A | 3/1970 | Gehrke | |
| 3,581,597 A | 6/1971 | Reiersgaard | 74/650 |
| 3,630,330 A | 12/1971 | Pflugner | |
| 3,700,082 A | 10/1972 | Schwab | 192/50 |
| 3,863,742 A | 2/1975 | Elmore et al. | |
| 3,935,753 A | 2/1976 | Williams | 74/650 |
| 4,373,407 A | 2/1983 | Okubo | 74/650 |
| 4,434,878 A | 3/1984 | Okubo | 192/48.92 |
| 4,620,806 A | 11/1986 | Rabe | |
| 4,681,180 A | 7/1987 | Oyama et al. | 180/76 |
| 4,782,720 A | 11/1988 | Teraoka et al. | 74/650 |
| 4,787,491 A | 11/1988 | Kato | 192/48.6 |
| 4,940,123 A | 7/1990 | Sayama | 192/58 B |
| 4,960,011 A | * 10/1990 | Asano | 74/650 |
| 5,025,902 A | 6/1991 | Imai et al. | 192/43 |
| 5,036,939 A | 8/1991 | Johnson et al. | 180/233 |
| 5,070,745 A | 12/1991 | Lindsey et al. | 74/665 GB |
| 5,189,930 A | * 3/1993 | Kameda | 74/650 |
| 5,203,232 A | 4/1993 | Ito et al. | 74/650 |
| 5,348,126 A | 9/1994 | Gao | 192/7 |
| 5,511,642 A | 4/1996 | Klotz et al. | 192/45 |
| 5,845,546 A | 12/1998 | Knowles et al. | 74/650 |
| 5,971,123 A | 10/1999 | Ochab et al. | 192/48.2 |
| 6,092,634 A | 7/2000 | Kremer et al. | |

FOREIGN PATENT DOCUMENTS

| | | |
|---|---|---|
| DE | 430321 | 6/1926 |
| JP | 59-86747 | 5/1984 |

* cited by examiner

Primary Examiner—Jack Lavinder
Assistant Examiner—Thomas Williams
(74) Attorney, Agent, or Firm—Drinker Biddle & Reath LLP

(57) ABSTRACT

A bi-directional overrunning clutch differential is disclosed for controlling torque transmission between a pinion input shaft and at least one output hub in a vehicle. The differential includes clutch a clutch housing and a roll cage. An electromagnetic indexing device is mounted adjacent to the cage and adapted to place the cage in position to engage the output hub to the input shaft. An electrohydraulic device is mounted adjacent to the clutch housing and includes a housing attached to the clutch and adapted to rotate in combination with the clutch housing. A hydraulic piston is located adjacent to a drive plate and adapted to cause the drive plate to engage to the housing when actuated, thereby providing dynamic torque between the output hub and the clutch housing.

30 Claims, 11 Drawing Sheets

BI-DIRECTIONAL OVERRUNNING CLUTCH WITH AUTOMATIC BACKDRIVE

RELATED APPLICATIONS

This application is related to and claims priority from U.S. Provisional Application Serial No. 60/249,617, filed Nov. 17, 2000. This application is also related to co-pending application Ser. No. 09/803,059 entitled "Spring Assembly for a Bi-Directional Overrunning Clutch" which was filed concurrently with the filing of this application.

FIELD OF THE INVENTION

The present invention relates to clutches and, more particularly, to a bi-directional electro-mechanical and electro-hydraulic overrunning clutch for providing four wheel drive capability with automatic backdrive.

BACKGROUND OF THE INVENTION

In recent years there has been a tremendous demand for off-road and all terrain vehicles. The interest in these types of vehicles has led to a wide variety of innovations. Many of the innovations have centered around making the vehicle more adaptable to changing road conditions, e.g., dirt roads, pavement and gravel. As the road terrain changes, it is desirable to vary the driving capabilities of the vehicle to more efficiently navigate the new terrain. Prior four-wheel drive and all terrain vehicles were cumbersome since they required the operator to manually engage and disengage the secondary drive shaft, e.g., by stopping the vehicle to physically lock/unlock the wheel hubs. Improvements in vehicle drive trains, such as the development of automated systems for engaging and disengaging a driven axle, eliminated many of the problems of the prior designs. These automated drive systems are sometimes referred to as "on-the-fly" four wheel drive. Many of these systems, however, require the vehicle to be in either 2-wheel or 4-wheel drive at all times.

Generally, all four-wheel drive vehicles include a differential for transferring torque from a drive shaft to the driven shafts that are attached to the wheels. Typically, the driven shafts (or half shafts) are independent of one another allowing differential action to occur when one wheel attempts to rotate at a different speed than the other, for example when the vehicle turns. The differential action also eliminates tire scrubbing, reduces transmission loads and reduces understeering during cornering (the tendency to go straight in a corner). There are four main types of conventional differentials: open, limited slip, locking, and center differentials. An open differential allows differential action between the half shafts but, when one wheel loses traction, all available torque is transferred to the wheel without traction resulting in the vehicle stopping.

A limited slip differential overcomes the problems with the open differential by transferring all torque to the wheel that is not slipping. Some of the more expensive limited slip differentials use sensors and hydraulic pressure to actuate clutch packs locking the two half shafts together. The benefits of these hydraulic (or viscous) units are often overshadowed by their cost, since they require expensive fluids and complex pumping systems. The heat generated in these systems, especially when used for prolonged periods of time, may also require the addition of an auxiliary fluid cooling source.

The third type of differential is a locking differential that uses clutches to lock the two half shafts together or incorporates a mechanical link connecting the two shafts. In these types of differentials, both wheels can transmit torque regardless of traction. The primary drawback to these types of differentials is that the two half shafts are no longer independent of each other. As such, the half shafts are either locked or unlocked to one another. This can result in problems during turning where the outside wheel tries to rotate faster than the inside wheel. Since the half shafts are locked together, one wheel must scrub. Another problem that occurs in locking differentials is twichiness when cornering due to the inability of the two shafts to turn at different speeds.

The final type of differential is a center differential. These types of differentials are used in the transfer case of a four wheel drive vehicle to develop a torque split between the front and rear drive shafts.

Many differentials on the market today use some form of an overrunning clutch to transmit torque when needed to a driven shaft. One successful use of an overrunning clutch in an all terrain vehicle is disclosed in U.S. Pat. No. 5,036,939. In that patent, the vehicle incorporates overrunning clutches where the wheel hub mounts to the axle, thus allowing each wheel to independently disengage when required.

Another successful use of an overrunning clutch in a differential is disclosed in U.S. Pat. No. 5,971,123, commonly owned by the assignee of the present invention. That patent describes an innovative electro-mechanical bi-directional overrunning clutch differential which addressed many of the problems inherent in the prior drive systems. The bi-directional overrunning clutch differential utilized electrically controlled coils to advance and retard a roll cage, thereby controlling the ability of the differential to engage and disengage depending on the operational state of the primary and secondary wheels. The bi-directional differential in U.S. Pat. No. 5,971,123 also describes a backdriving system. The backdriving system operates by controlling the energizing of selected coils to actively engage the secondary shafts in certain situations where extra traction is needed. For example, when the vehicle is driving down a slope the system engages the front wheels, which are the wheels with the better traction.

The backdrive system in the bi-directional differential disclosed in U.S. Pat. No. 5,971,123, like the overrunning clutch mechanism, uses coils to drag and advance the roll cage for engaging and disengaging the shafts.

While the electro-mechanical bi-directional differential in U.S. Pat. No. 5,971,123 provides a substantial improvement over prior differential drives, the design of the system did not readily permit automatic engagement of the backdrive.

A need, therefore, exists for an improved bi-directional differential which is compact, relatively inexpensive to manufacture and which provides automatic backdrive capability.

SUMMARY OF THE INVENTION

A bi-directional overrunning clutch is disclosed for controlling torque transmission between a secondary drive shaft and secondary driven shafts. The present invention, when used in a vehicle, provides four wheel drive capability in the event of traction loss on any primary drive shaft.

The overrunning clutch includes a differential housing with a pinion input shaft extending outwardly from the housing. One end of the pinion input shaft is engaged with the secondary drive shaft. The other end of the input shaft is located within the differential housing and includes an input gear. The input gear preferably engages with a ring gear rotatably disposed within the housing such that rotation of the input gear produces concomitant rotation of the ring gear.

A clutch housing is disposed on the ring gear and includes an inner surface. At least one and preferably two races are located adjacent to the inner surface. At least one of either the race or the inner surface defines a cam surface. Each race is engaged with an output hub. The output hub, in turn, is engaged with a secondary driven half shaft.

A roll cage is located between the race and the inner surface of the housing. The roll cage has a plurality of slots which are preferably spaced equidistantly about its circumference. Each slot has a roll located therein and which is biased by an independent spring. The roll cage is movable with respect to the clutch housing and the races.

An armature plate is located adjacent to and engaged with the roll cage so that the armature plate rotates in conjunction with the roll cage. The engagement between the armature plate and the roll cage furthermore permits the armature plate to be rotated with respect to the roll cage.

An indexing device, such as a driving coil is mounted within the differential housing adjacent the armature plate. The coil is adapted to produce an electromagnetic field when energized which hinders the rotation of the armature plate, thus causing the roll cage to drag with respect to the clutch housing. The dragging of the roll cage with respect to the clutch housing causes the rolls to engage the clutch housing and the race when the wheels on the primary drive shaft lose traction. When traction loss occurs, the rolls become wedged between the clutch housing and the race so as to provide torque transfer between the two.

A first clutch pack assembly is mounted to the clutch housing between the armature plate and the differential housing. The clutch pack assembly is similar to a slip clutch design. The clutch pack assembly includes a clutch pack housing which surrounds at least one friction plate and at least one drive plate. The friction plate and the drive plate are rotatable with respect to one another when the plates are not forced into contact with one another. The friction or wear plate is engaged with the clutch pack housing such that rotation of the clutch pack housing produces concomitant rotation of the friction plate. The drive plate is attached to the output hub such that the drive plate rotates in conjunction with the output hub. In one embodiment, the drive plate includes splines that engage with mating splines formed on an adapter ring. The adapter ring, in turn, is splined to the output hub.

The clutch pack assembly also includes a hydraulic piston which is mounted to the clutch pack housing and adapted, when actuated, to apply pressure to the friction plate and drive plate. When sufficient pressure is applied to the friction and drive plates, the output hub becomes engaged with the clutch pack housing and, as such, the clutch housing and the input pinion.

A second clutch pack assembly is preferably mounted to the clutch housing on the opposite of the clutch housing from the first clutch pack assembly. The second clutch pack assembly includes a second clutch pack housing which surrounds at least one friction plate and at least one drive plate. The friction plate and the drive plate in the second clutch pack assembly are rotatable with respect to one another when the plates are not forced into contact with one another. The friction plate is engaged with the second clutch pack housing such that rotation of the second clutch pack housing produces concomitant rotation of the friction plate. The drive plate is engaged to the output hub such that the drive plate rotates in conjunction with the output hub. In one embodiment, the drive plate is splined to an adapter ring which, in turn is splined to the output hub.

The second clutch pack assembly also includes a hydraulic piston which is mounted to the second clutch pack housing and adapted, when actuated, to apply pressure to the friction plate and drive plate. When sufficient pressure is applied to the friction and drive plates, the output hub becomes engaged with the second clutch pack housing and, accordingly, with the clutch housing and the input pinion.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE EMBODIMENTS

Figure 1:
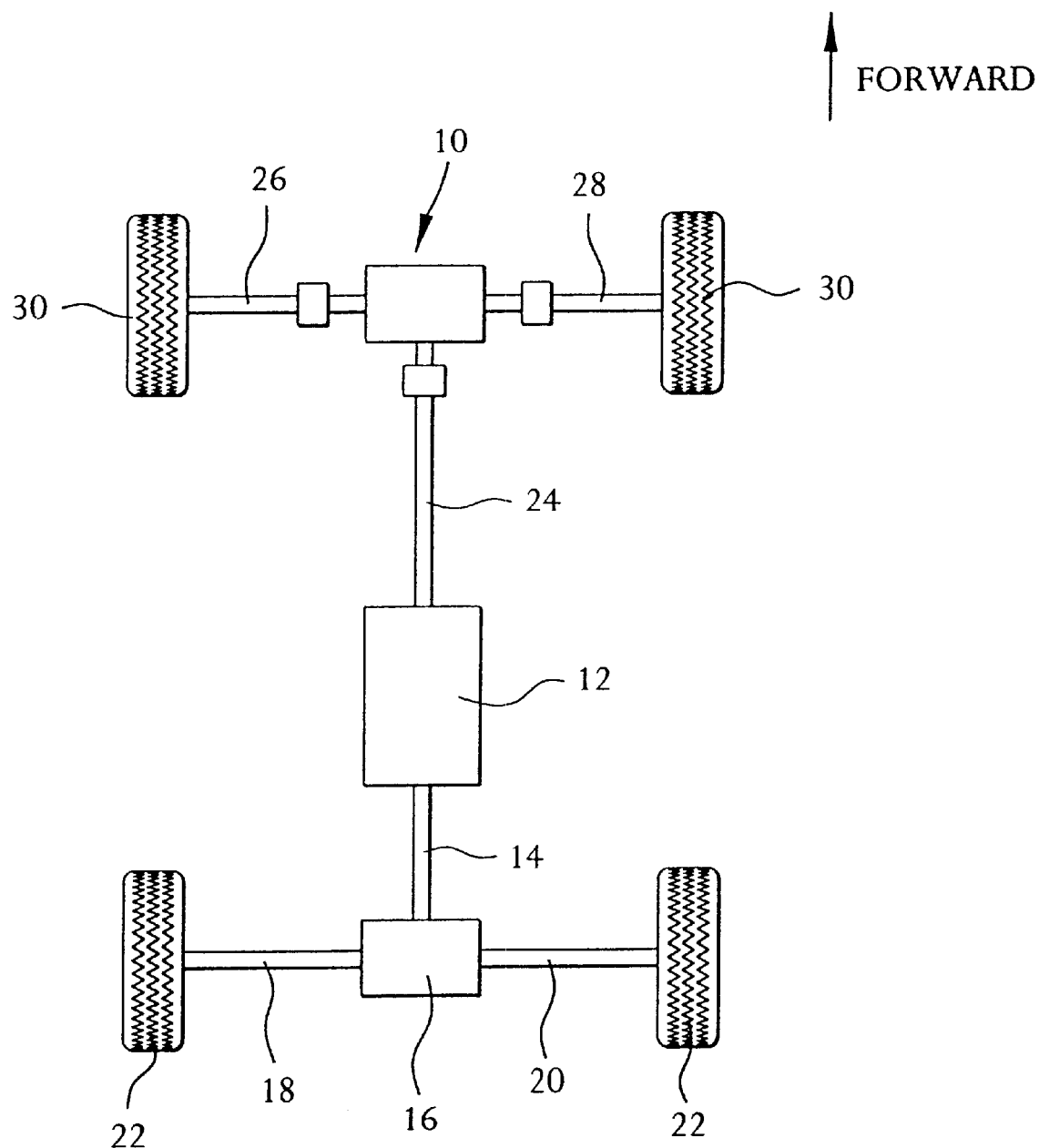
FIG. 1 is a schematic representation of one drive train embodiment in a vehicle incorporating the present invention.

Referring now to the drawings, wherein like reference numerals illustrate corresponding or similar elements throughout the several views, FIG. 1 is a schematic representation of one embodiment of a drive system incorporating a bi-directional overrunning clutch 10 incorporating the present invention. The drive system includes a transmission 12, a primary drive shaft 14 a primary differential 16, and first and second primary driven shafts 18, 20 which drive primary wheels 22.

The drive system also includes a secondary drive shaft 24 which is rotatably connected to the bi-directional overrunning clutch 10 through any conventional means known to those skilled in the art, such as a splined connection. The overrunning clutch 10, in turn, rotatably drives two secondary driven shafts 26, 28 which are attached to wheels 30.

Figure 2:
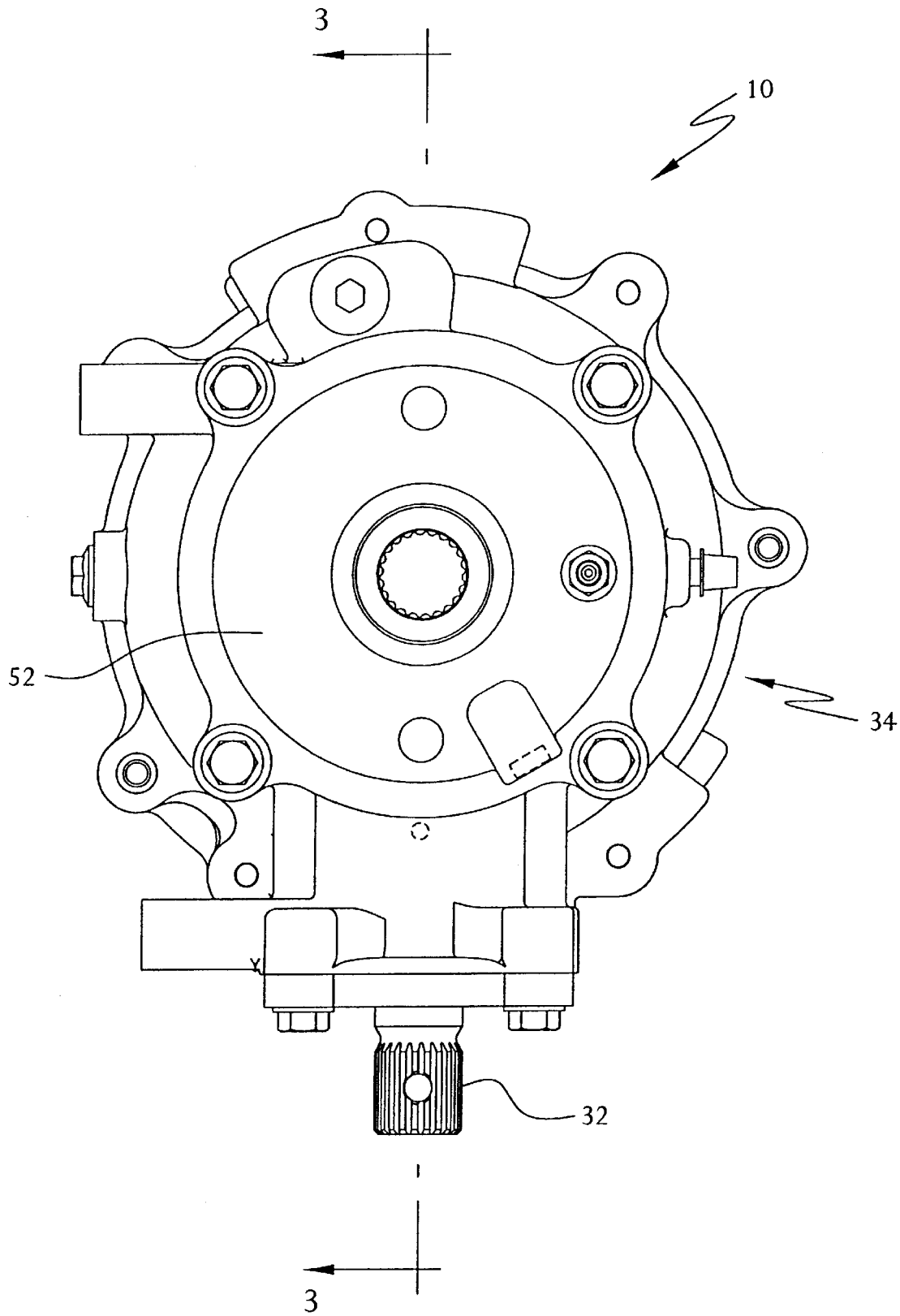
FIG. 2 is a right side view of one embodiment of the bi-directional overrunning clutch according to the present invention.

The details of the bi-directional overrunning clutch will now be described with respect to FIGS. 2 through 5. FIG. 2 illustrates the right cover 52 of the bi-directional overrunning clutch 10. The secondary drive shaft 24 engages with a splined end of a pinion input shaft 32. The pinion input shaft 32 extends out from and is rotatable with respect to a differential housing 34. More specifically, the pinion input shaft 32 is located within a bearing assembly 36, such as a roller bearing. The pinion input shaft 32 is positioned against the inner race of the bearing 36. The outer race of the bearing 36 is located within the differential housing 34. The bearing assembly 36 is mounted within the differential housing 34 by any conventional means. A pinion cover 40 is mounted to the differential housing 34 and prevents the bearing 36 from sliding out of the housing 34. An oil seal 42 is located between the pinion cover 40 and the pinion input shaft 32. The oil seal 42 prevents oil from escaping out of the bearing assembly 36. A rubber O-ring 44 is located between the pinion cover 40 and the differential housing 24 to provide a fluid tight seal.

The pinion input shaft 32 preferably has a bevel gear 46 formed on or attached to the end of the shaft 32 located within the differential housing 34. The bevel gear 46 is preferably made from steel material with straight bevels, although the bevels could be spiral or hypoid. The bevel gear 46 engages with a ring gear 48 located within the differential housing 34. The ring gear 48 is preferably made from steel with spiral bevels. Those skilled in the art would appreciate that various angles for providing mating between the gears can be used in the present invention depending on the design of the entire clutch system and the anticipated loading. Furthermore, it is contemplated that other gearing arrangements, such as a worm gear set, may be used for engaging the pinion input shaft 32 to the differential housing 34. A pinion bushing 47 is located between an end of the input pinion shaft 32 and the differential housing 34. The pinion bushing 47, in combination with the bearing 36, allow the input pinion shaft 32 to rotate freely with respect to the differential housing 34.

The ring gear 48 is preferably attached to or formed integral with a clutch housing 50 which will be described in more detail hereinafter. The right cover plate 52 is located adjacent to the ring gear 48 and attached to the differential housing 34 though any conventional means, such as bolts. A rubber O-ring 54 is preferably positioned between the right cover plate and the differential housing 34 for providing a fluid tight seal.

A bushing 60 is mounted between the clutch housing 50 and the differential housing 34 which permits the clutch housing 50 to freely rotate within the differential housing 34. The bushing 60 is preferably made from a composite material. One suitable type of bushing is an MB 8541DU bearing sold by Garlock Bearing Inc., Thorofare, N.J. The clutch housing 50 is preferably made from steel material and has an inner surface which is discussed in more detail below. A roller assembly 62 is located within the clutch housing 50 and includes a roll cage 64 which contains a plurality of rolls 66. In one preferred embodiment, the roll cage 64 preferably includes two independent sets of rolls 66 disposed within slots formed in the roll cage 64 around its circumference. In the illustrated embodiment there are seven rolls in each set of rolls. The roll cage 64 is preferably made from hard anodized aluminum material. Alternatively, the roll cage 64 can be made from plastic or composite material. The rolls 66 are preferably made from hardened steel material.

One feature of the invention that is different than typical overrunning clutch designs is that the roll cage 64 is preferably allowed to float within the clutch housing 50. Springs 70 are located on each side of the rolls 66 and are designed to center the rolls 66 within a contoured recess formed between the clutch housing and a race when in neutral as will be explained in more detail below. The configuration of the springs 70, including the amount of take-up the springs provide, accommodates spacing variations between the clutch housing 66 and the race. As such, the roll cage does not need to be piloted onto the clutch housing 66, but may be free to float.

The floating of the roll cage provides a unique advantage over prior roll cage designs. In prior designs, the tolerances between both output hubs and the clutch housing had to be closely controlled. In those prior designs if the spacing between one output hub and the clutch housing differed from the spacing between the other output hub and the clutch housing, the rolls would not engage both output hubs. As such, torque would only transmit through one output hub. Also, the location of the slots which retained the rolls also had to be closely controlled since imprecise location of a slot could result in less than all the rolls engaging with an output hub.

The present invention overcomes these deficiencies by allowing the rolls to float and become self-adjusting. As such, the rolls engage simultaneously with the clutch housing and both output hubs, thereby maximizing torque transmission through the differential and providing control over both wheels.

Figure 7B:
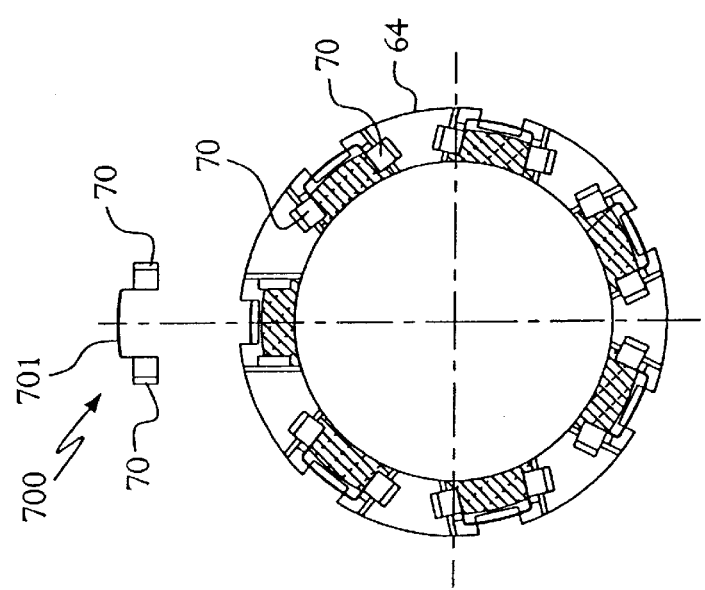
FIG. 7B is a section view along 7B—7B in FIG. 7A illustrating the spring assembly mounted within the roll cage.
Figure 7C:
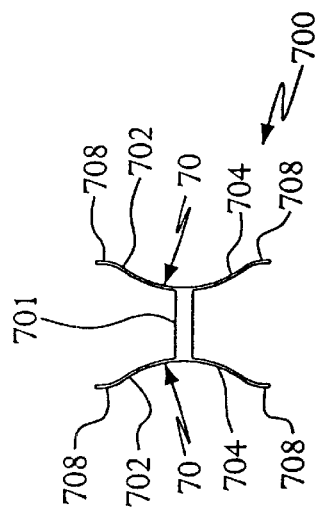
FIG. 7C is a top view of one preferred embodiment of the spring assembly according to the present invention.
Figure 7A:
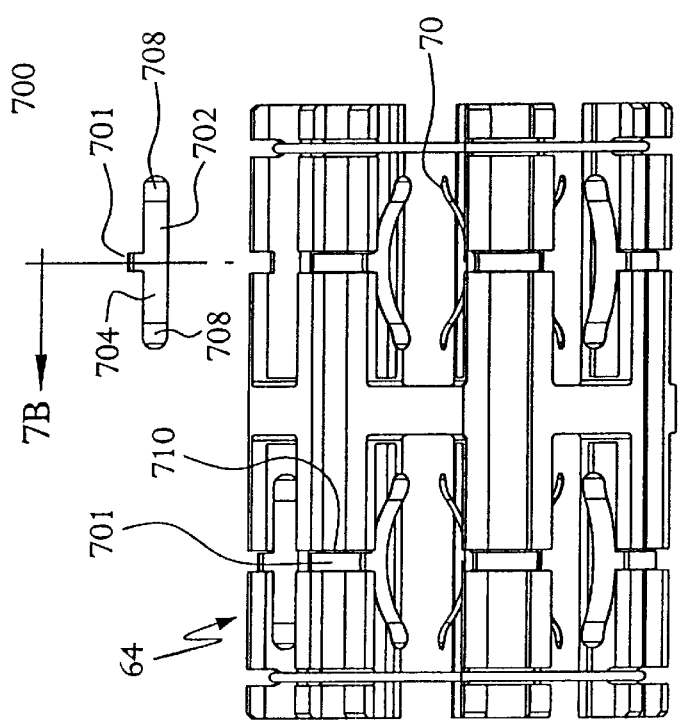
FIG. 7A is a side view of a roll cage with a novel spring assembly according to the present invention.

In one embodiment of the invention, the springs 70 are part of a novel spring assembly. The spring assembly has independent arms that position the rolls 66 within the slots of the roll cage 64. More specifically and referring to FIGS. 7A–7C, the roll cage 64 is shown with the springs 70 mounted so as to be positioned within the slots in the cage 64. As shown, springs 70 in adjacent slots are connected so as to essentially form an H-shaped spring assembly 700. Each assembly 700 includes two independent springs 70 that are attached to or formed on opposite sides of abridge 701. The bridge 701 separates each spring 70 into two opposed arms 702, 704. The arms 702, 704 are preferably curved or arcuate in shape such that the combination of the arms is concave, similar to the shape of a leaf spring. However, the arms 702, 704 may also be linear such that they combine with the bridge to form a Y shape. The bridge acts as a yoke to support the arms 702, 704, permitting them to bend independently from one another, as well as from the opposite spring 70. Each arm has an end 708 which may be slightly flattened and adapted to contact a roll within the cage 64.

The roll cage includes a plurality of recesses 710 which extend between adjacent slots. The recesses 710 are sized to receive the bridge 701 of a spring assembly 700 such that the springs 70 are positioned within the slots. The bridge 701 retains and supports the springs 70 in the slots. The slots each preferably include a channel in each side wall. The arms 702, 704 of the spring 70 are located within the channel and are adapted to deflect into the channel. The walls of the channel prevent the rolls 66 from completely flattening the spring 70, thus preventing over-stressing and fatigue of the spring 70. This novel spring and roll cage design allows the arms 702, 704 of each spring 70 to independently bias the rolls into a neutral position, while allowing the roll cage to float within the clutch housing.

Figure 11:
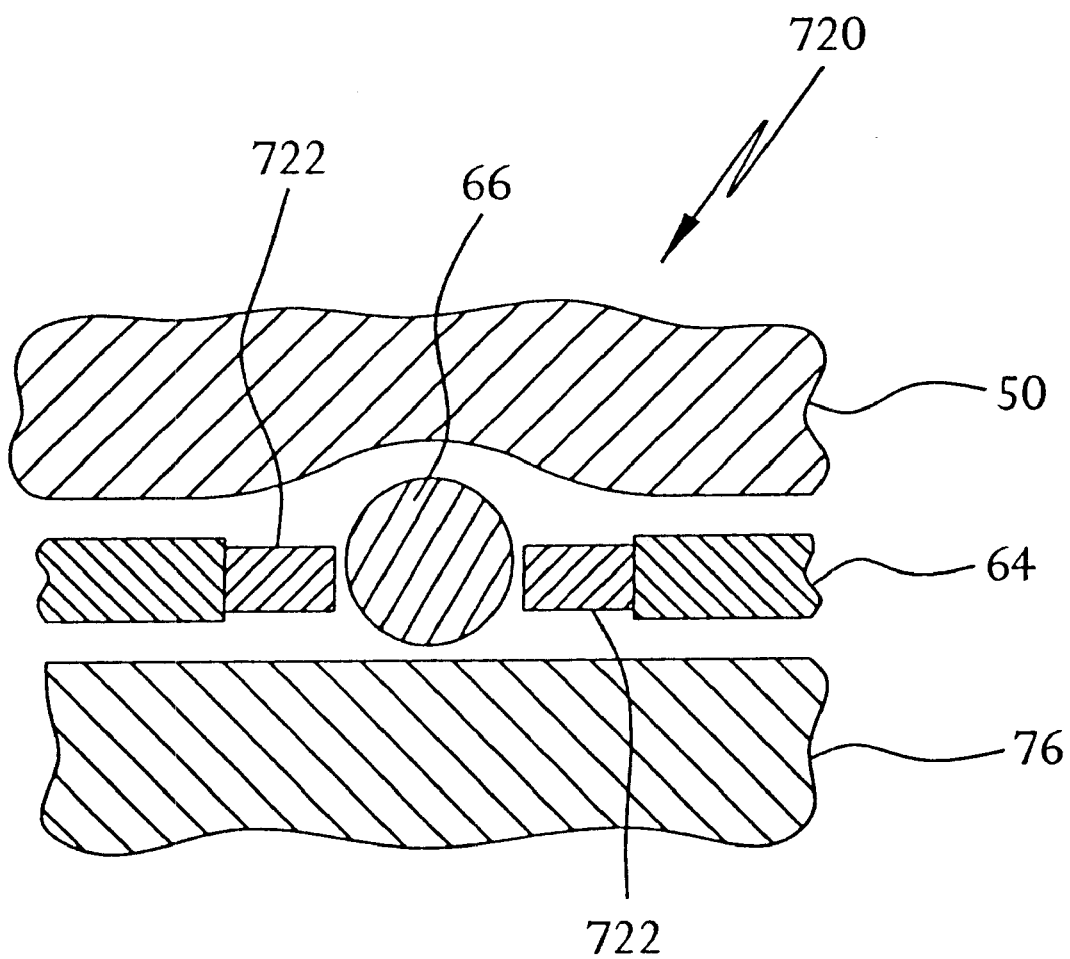
FIG. 11 is a cross-section of an alternate embodiment of the overrunning clutch illustrating an alternate embodiment of the spring assembly.

FIG. 11 is a cross-section of an alternate embodiment of the spring assembly 720. In this embodiment, resilient members 722 are located on opposite sides of each roll 66. The resilient members operate independently to bias the rolls 66 into a neutral position (i.e., substantially centered in the slot.) Each resilient member 722 is adapted to deflect or compress when the roll 66 is driven into it, such as when the clutch housing begins to rotate faster than the output hubs during slippage of the primary drive wheels. When the primary wheels regain their traction, the clutch housing again begins to overrun the output hubs, thus permitting the resilient member 722 to once again force the roll 66 back into the neutral position.

It is contemplated that the resilient members can be independent springs, such as leaf springs, or could be made from a resilient material, such as elastomer (rubber).

In both embodiments described above, the independent springs permit the rolls to float in the cage. As such, manufacturing variances in the clutch housing and output hubs are accommodated, thus permitting all the rolls to engage both output hubs and the clutch housing substantially simultaneously.

The springs 70 and the floating roll cage 64 ensure all rolls are pushed into engagement when driving torque is required. This is a unique improvement over conventional designs which pilot the roll cage on the clutch housing. The floating and centering features of the present invention ensure that all the rolls 66 carry torque and enables the clutch to compensate for any manufacturing discrepancies, such as variations in the size of the output hub races. Since all the springs 70 act independently, the rolls are all positioned correctly during operation of the differential. The present design can also accommodate taper or size change in the recess contour, e.g., cam profile formed in the clutch housing. This feature of the invention, thus, ensures that both output hubs are engaged when required.

Each set of rolls 66 is located adjacent to the inner surface of the clutch housing 50. In one embodiment, the clutch housing includes a contoured cam surface. The contour of the cam surface is shown in more detail in FIGS. 6A through 6D and is configured with a plurality of peaks and valleys. When the roll cage 64 is located within the clutch housing 50, the rolls 66 are located within the valleys with the cam surface tapering toward the race on either side of the roll 66 (generally referred to herein as tapered portions $50_T$). The cam surface and rolls 66 provide the bi-directional overrunning capabilities as will be discussed hereinafter. Cam surfaces and roll cages in overrunning clutches are well known in the art. See, e.g., U.S. Pat. Nos. 4,373,407 and 5,971,123, which are incorporated herein by reference in their entirety. Hence, a detailed discussion of these features is not needed.

At least one and preferably two races 76 are rotatably located in the center of the roll cage 64. Each race 76 is adjacent one of the sets of rolls 66 such that the outer surface of the race 76 contacts the set of rolls 66. As will become evident hereinafter, the contact between the rolls 66, the clutch housing 50 and the races 76 causes the races 76 to rotate with the clutch housing 50. The races 76 are preferably made from hardened steel material. A thrust bearing 77 is disposed between the two races 76 to allow the races 76 to freely rotate with respect to one another.

Each race 76 is engaged with or formed on a corresponding output hub 78 through any conventional means designed to transfer torque from the race 76 to the output shaft 78. In the preferred embodiment, each race 76 is an integral part (portion) of the hub 78 as shown.

The hub 78 preferably includes a mechanism for attaching with the secondary shafts 26, 28 (FIG. 1). In the illustrated embodiment, the hub includes a recess 80 with splines formed in it. The splines mate with corresponding splines formed on the secondary shafts in a manner well known to those skilled in the art. Alternately, the hub 78 may include a output shaft portion which extends out of the differential housing and couples with the secondary shaft as shown in U.S. Pat. No. 5,971,123. The output hub 78 and race are preferably made from steel material. It is contemplated that the race 76 and output hub 78 can be formed as separate components if desired. A roller bearing 88 surrounds a portion of one of the output hubs 78 and engages with the right cover plate 52. The roller bearing 88 supports the output hub 78 while permitting the output hub 78 to rotate with respect to the cover plate 52. An oil seal 90 is preferably disposed between the right cover plate 52 and the output hub 78 to provide a fluid tight seal between the two components.

Similarly, the other output hub 78 (i.e., the left output hub) is located adjacent to an opening 92 in a left cover plate 94. A roller bearing 96 is disposed between a portion of the output hub 78 and the left cover plate 94 to permit the output hub 78 to rotate freely with respect to the left cover plate 94. An oil seal 98 is preferably incorporated between the left cover plate 94 and the output hub 78 to provide a fluid tight seal. The left cover plate 94 is attached to the differential housing 34 by any conventional means, such as bolts. A rubber O-ring 100 is preferably inserted between the left cover plate 94 and the differential housing 34.

To assist in aligning the two output hubs 78, one of the output hub hubs 78 preferably includes an extension 102, such as a dowel pin, which mates with a recess 104 formed in the other output hub 78. A bushing 106 can be placed on the protrusion 102 or in the recess 104 to facilitate relative motion between the two hubs.

As noted above, the output hubs 78 couple to secondary half shafts which drive the vehicle's wheels 30. For the sake of simplicity, the output hubs 78 and two half shafts are collectively referred to herein as the secondary driven shafts 26, 28.

As discussed briefly above, the engagement of the rolls 66 with the clutch housing 50 and races 76 permits the transfer of torque from the secondary drive shaft 24 to the secondary driven shafts 26, 28. In order to activate the overrunning clutch, the present invention incorporates electromagnetic and/or electrohydraulic systems. More specifically, one embodiment of the present invention includes at least one electromagnetic roll cage adjustment or indexing device connected to an electronic control system and preferably two electrohydraulically controlled dynamic torque transfer mechanisms which are preferably controlled by the operational state of the vehicle. In one preferred configuration, the electromagnetic roll cage adjustment device includes a coil and armature plate which control retarding of the roll cage 64 with respect to the clutch housing 50.

More particularly, a driving coil 108 is located within a coil insert 110 which is mounted to the right cover plate 52. The coil insert 110 is preferably made from a metallic material, such as steel or powdered metal, and is press fit or similarly attached to the housing. The driving coil 108 is preferably annular in shape with a central axis coincident with the axis of rotation of the roll cage 64. The driving coil 108 is preferably a bobbin wound coil which includes a plastic base about which the coil is wound. Suitable coils for use in the present invention are well known to those skilled in the electric clutch art. One satisfactory coil is disclosed in U.S. Pat. No. 5,036,939, which is incorporated by reference herein in its entirety. Other suitable coils are available from Endicot Coil Co., Inc. Endicot, N.Y. The driving coil 108 is preferably bonded or otherwise attached to the coil insert 110.

An armature plate 112 is located between the driving coil 108 and the roll cage 64. The armature plate 112 is preferably annular in shape and is free to rotate with respect to the driving coil 108 when the coil is not energized. The armature plate 112 includes at least one and, more preferably a plurality of tangs or fingers 114 which protrude from the armature plate 112 toward the roll cage 64. The tangs 114 engage with slots 116 formed in the roll cage 64. The armature plate 112 is engaged with the roll cage 64 when the tangs 114 are engaged with the slots 116. Hence, when the driving coil 108 is not energized, the armature plate 112 rotates with the roll cage 64 relative to the clutch housing 50. The armature plate 112 is preferably made from steel material.

When the driving coil 108 is energized, an electromagnetic field is generated between the driving coil 108 and the armature plate 112 attracting the armature plate 112 to the driving coil 108, thus causing it to drag. Since the armature plate 112 is engaged with the roll cage 64 by the tangs 114, the dragging of the armature plate 112 causes the roll cage 64 to also drag or retard. In an alternate embodiment (not shown), the tangs 114 on the armature plate 112 do not engage with slots 116 formed in the roll cage 64. Instead, the tangs 114 engage with protrusions formed on the roll cage 64 when the driving coil 108 is energized.

The driving coil 108 is connected to a electronic control system, such as a signal processor or manually activated electrical system, for controlling the energizing of the coils. Other types of control systems can also be used in the present invention. (The electronic control system is generally identified by the numeral 142 in FIG. 5 and described in more detail below.)

Figure 3:
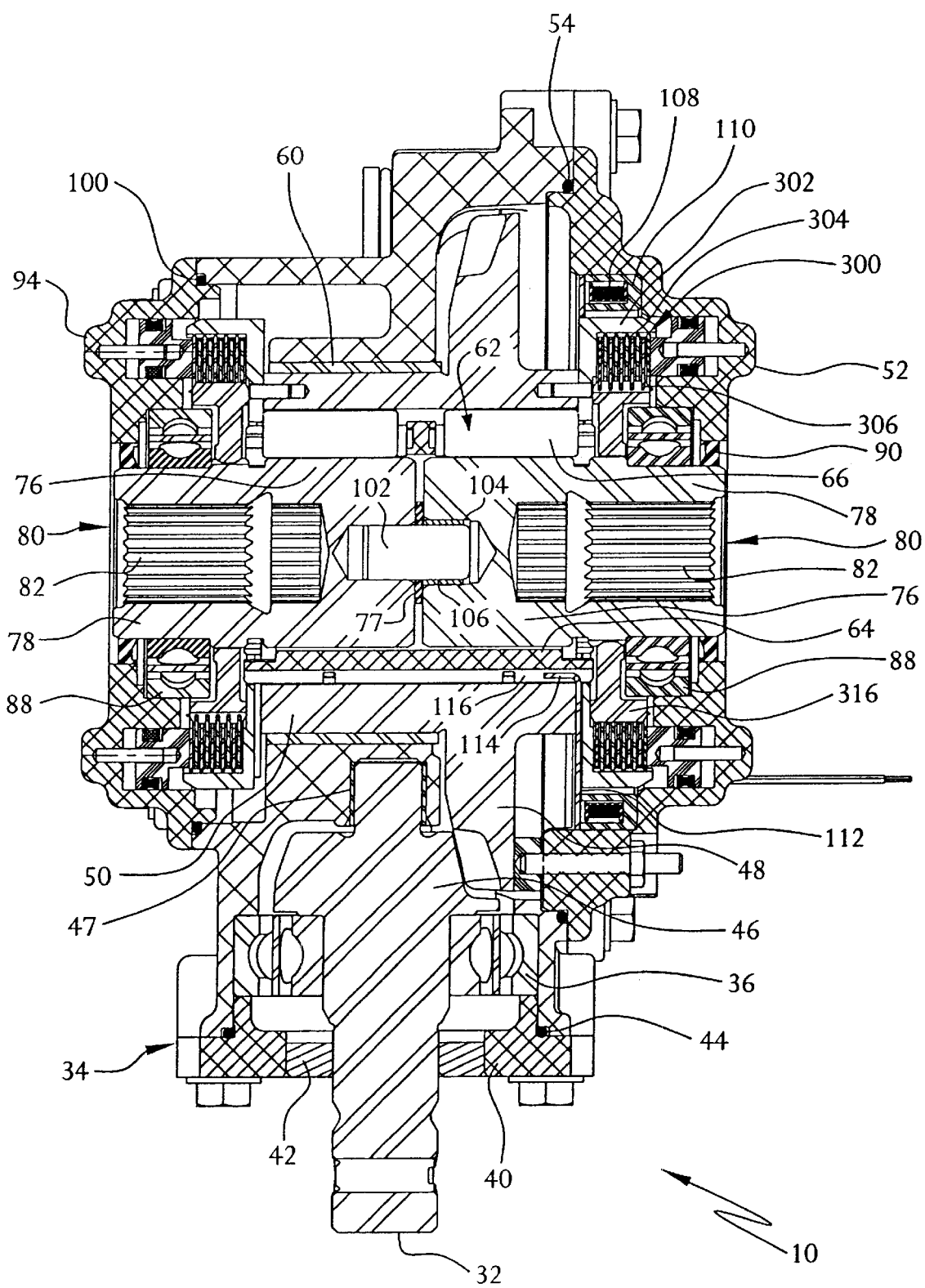
FIG. 3 is cross-sectional view of the bi-directional overrunning clutch taken along lines 3—3 in FIG. 2.
Figure 4:
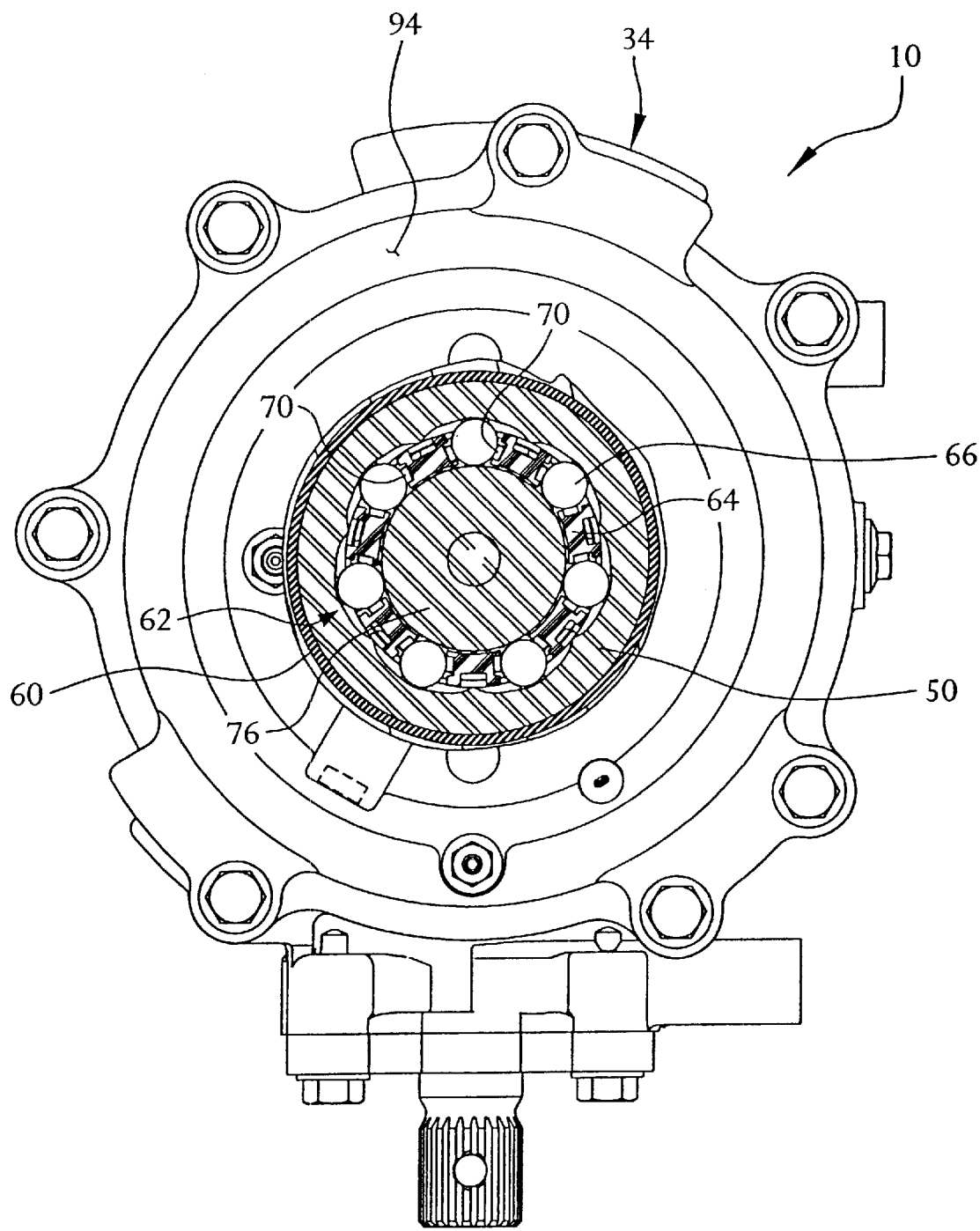
FIG. 4 is a partial cross-sectional view of the bi-directional overrunning clutch taken along lines 4—4 in FIG. 3.

A first clutch pack 300 is preferably located between the right cover plate 52 and the clutch assembly 50. More particularly, as shown in FIGS. 3 and 4, the first clutch pack 300 includes a clutch pack housing 302 which is attached to the clutch housing 50 through a plurality of dowel pins. The clutch pack housing 302 preferably includes a plurality of notches 303 formed on its outer surface which accommodate the tangs 114 of the armature plate 112. The notches are sized so that the armature plate 112 can adjust as discussed below without any interference from the clutch pack housing 302.

The clutch pack housing 302 contains at least one friction plate 304 and at least one drive plate 306. The friction plate 304 and the drive plate 306 are rotatable with respect to one another when the plates are not forced into contact with one another. More preferably, there are a plurality of friction plates 304 and a plurality of drive plates 306 interleaved with each other such that a friction plate is adjacent to a drive plate. The friction plates 304 are engaged with the clutch pack housing 302 such that rotation of the clutch pack housing 302 produces concomitant rotation of the friction plates 304. In the illustrated embodiment, the friction plates 304 include at least one and, more preferably, a plurality of protrusions or tabs 308 that extend radially outward from the friction plates 304. The protrusions 308 engage with cutouts or notches 310 formed in the clutch pack housing 302. It is also contemplated that, instead of the tabs shown in FIG. 5, the friction plate can include outer splines which engage with inner splines on the clutch pack housing 310.

The drive plates 306 are engaged with the output hub 78 such that rotation of the output hub 78 produces concomitant rotation of the drive plates 306. In the illustrated embodiment, the drive plates include a plurality of splines 312 that mate with splines 314 formed on an outer circumference of an adapter ring 316. The adapter ring 316, in turn, is engaged with the output hub 78. More specifically, in a preferred embodiment, the adapter ring 316 includes a set of internal splines 318 which mate with corresponding splines 319 formed on a portion of the output hub 78. As such, rotation of the output hub 78 produces rotation of the adapter ring 316 and drive plates 306. Although an adapter plate is used in the illustrated embodiment, it is also contemplated that the drive plates can engage directly with the output hub 78. Furthermore, it is contemplated that the drive plates 306 and/or adapter ring 316 can be formed with tabs or other types of devices for engaging with the output hub 78. Those skilled in the art would readily be capable of utilizing alternate means for mounting these components together for providing the requisite torque transfer in light of the teachings provided herein.

The clutch pack assembly also includes a hydraulic piston 320 which is mounted to the clutch pack housing 302 and adapted, when actuated, to apply pressure to the friction plates 304 and drive plates 306. When sufficient pressure is applied to the friction and drive plates 304, 306, the output shaft 78 becomes engaged with the clutch pack housing 302 and, as a result, the clutch housing 50 and the input pinion 32. The hydraulic piston 320 is attached to the right cover plate, preferably with a plurality of dowel pins to inhibit radial rotation.

The hydraulic piston 320 is made of a bearing material which can accommodate thrust loads and preferably has seals installed on its inner diameter and outer diameter to prevent fluid leakage. The hydraulic piston is ring shaped in the preferred embodiment although other configurations can be used in the present invention. A hydraulic pressure source (not shown) is coupled to the inlet of the hydraulic piston. The hydraulic pressure source may consist of an electric motor driving a mechanical pump or a mechanical pump with electrically controlled valving. Those skilled in the art are familiar with hydraulic pistons and would readily be capable of selecting an appropriate pressure source for supplying hydraulic fluid under pressure.

A second clutch pack assembly 300 is mounted on the left side of the differential housing 34, between the left cover plate 94 and the clutch housing 50. The second clutch pack assembly 300 is identical to the first clutch pack assembly 300. Thus, no further discussion is needed.

Figure 5:
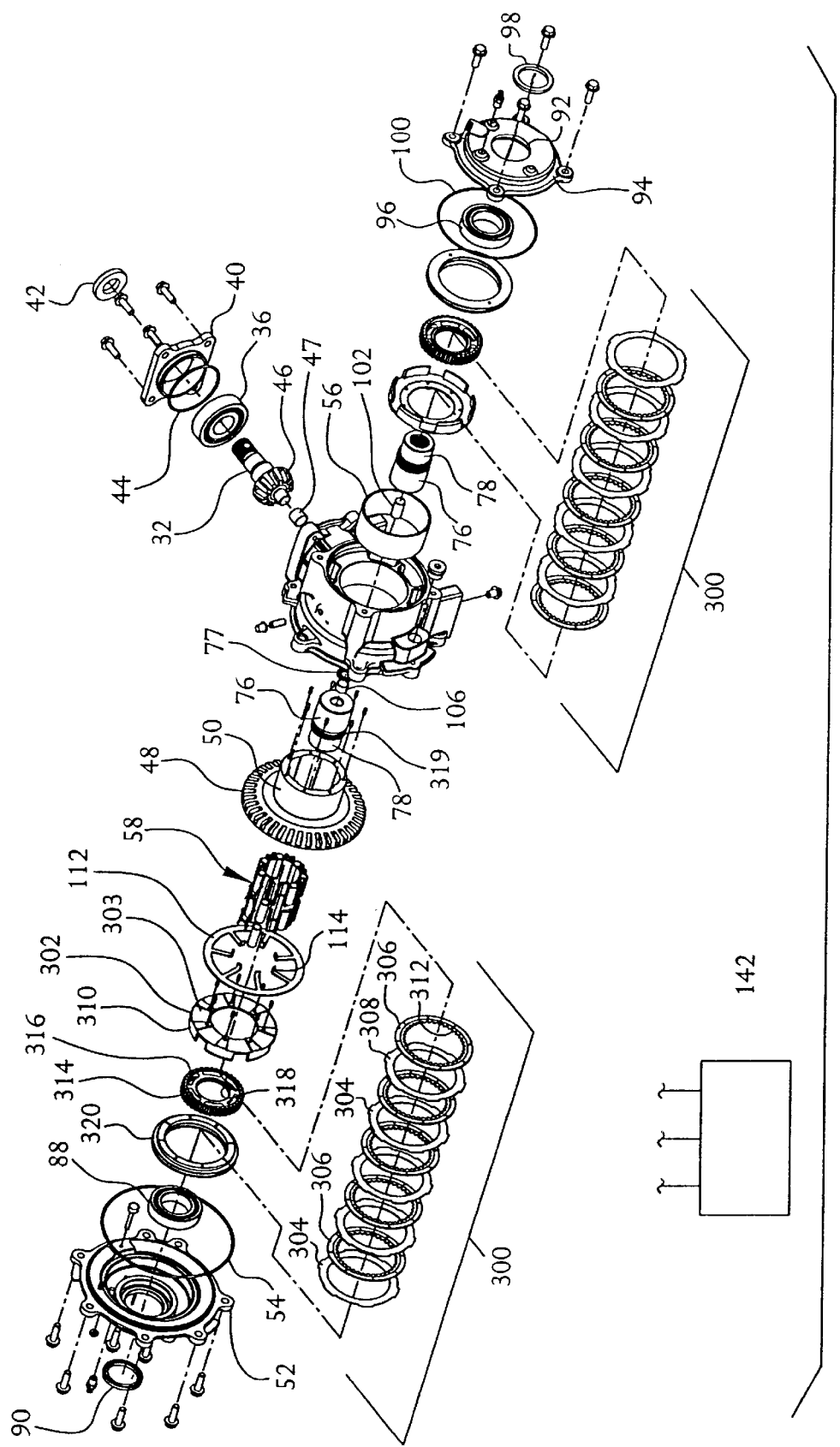
FIG. 5 is an exploded view of the bi-directional overrunning clutch shown in FIGS. 2–4.

The hydraulic piston and/or hydraulic source is preferably controlled by the electronic control system 142 shown in FIG. 5. Preferably one hydraulic source supplies fluid to both hydraulic pistons.

Figure 8A:
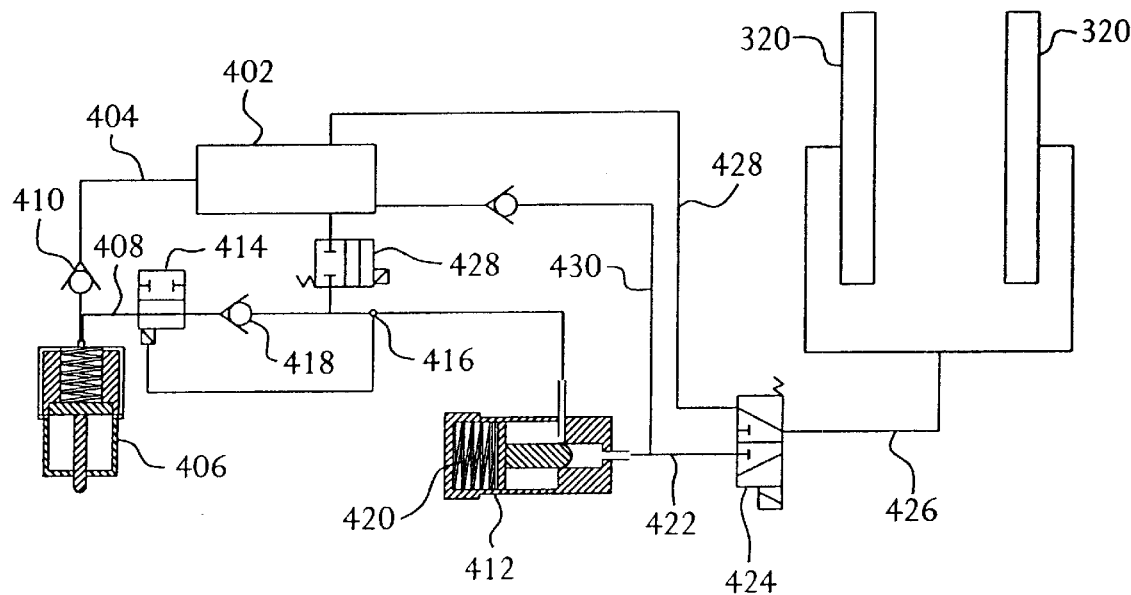
FIGS. 8A and 8B are schematic views of one embodiment of a system for controlling the operation of the pistons in the clutch pack assemblies.
Figure 8B:
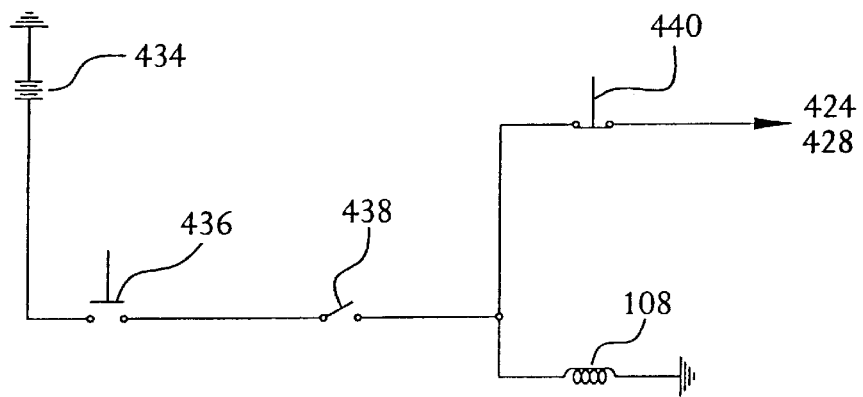

Referring now to FIGS. 8A and 8B, a schematic illustration of one embodiment of a mechanical system for hydraulically driving the pistons 320 in the clutch pack assemblies is shown. A fluid reservoir 402 contains hydraulic fluid and supplies fluid along a first fluid supply line 404 to a pump 406 which pressurizes the fluid and supplies it along a second fluid supply line 408 to an accumulator 412. In one embodiment the pump 408 is engaged with the differential so as to pump the fluid as the vehicle operates. Various other mechanisms can be used to pressurize the fluid within the fluid system. A check valve 410 prevents backflow into the reservoir 402.

A first solenoid 414 is located on and controls flow along the second fluid supply line 408. The first solenoid 414 is preferably controlled by the ignition such that the solenoid is in its open position (permitting flow) when the vehicle is on. A sensor 416 is located along the second fluid line 408 and monitors the pressure within the second fluid supply line 408. When the pressure along the line reaches a prescribed level (e.g., 20 psi), the sensor 416 sends a signal to close the first solenoid 414. A check valve 418 is located downstream from the first solenoid 414 and prevents backflow through the first solenoid 414.

The accumulator 412 receives the pressurized fluid which causes a spring 420 to compress, generating potential energy in the spring 420. Accumulators are well known in the art and, therefore, no further discussion is necessary regarding the specific configuration of the accumulator. The accumulator 412 supplies a second flow of high pressure hydraulic fluid along a third fluid line 422 to a second solenoid 424. The second solenoid 424 is normally in a closed position as shown. The high pressure fluid is channeled from the second solenoid 424 along a fourth fluid line 426 to the pistons 320.

When the second solenoid 424 is in its closed position as shown, the fourth fluid line 426 permits flow of fluid along a return fluid line 428 which channels the fluid to the reservoir. Thus, when the second solenoid 424 is closed, the pistons 320 are not pressurized.

When it is desired to pressurize the pistons 320, a signal is sent to open the second solenoid 424, permitting fluid to flow from the accumulator 412 along the fourth fluid line 426. To actuate the accumulator 412, a pressure relief solenoid 428 is preferably opened simultaneously with the opening of the second solenoid 424. The pressure relief solenoid 428 depressurizes the second fluid supply line 408 and the accumulator 412 by permitting fluid to flow back into the reservoir 402. When the pressure along the second fluid line 408 is released, the potential energy of the spring 420 forces high pressure fluid to flow through the second solenoid 424.

An additional flow line 430 communicates with the accumulator 412 or the third fluid supply line 422 for channeling of fluid from the reservoir 402 to recharge the accumulator 412. A check valve 432 may be included along this fluid line to prevent backflow into the reservoir 402. The check valve 432 can be set to prevent over pressurization of the second solenoid 424.

Referring to FIG. 8B, an electrical schematic for controlling the solenoids and coil is shown. Power is supplied from a power source 434 through a switch 436. The switch is set to be closed when the activation of the four wheel drive mode or backdriving mode of the vehicle may be necessary. For example, in one configuration of the system, the switch is closed when the stick shift is in high range, low range and reverse, and is open for all other stick positions.

A second switch 438 is either an automatically activated or, more preferably, a manually controlled on/off switch. Activation of the switch (i.e., closing the switch) supplies power to activate the coil 108 and an activation switch 440. The activation switch 440 controls the supplying of power to the second and pressure relief solenoids 424, 428. The activation switch 440 is preferably connected to the throttle and is normally in its closed position. When the throttle is applied, the switch opens, cutting off power to the second and pressure relief solenoids 424, 428. As such, fluid is not supplied to the pistons. Instead, the accumulator is pressurized up to the predetermined value (e.g., 20 psi.) When the throttle is not applied, for example during deceleration, the switch closes and the second and pressure relief solenoids are opened. As such, the charged accumulator supplies high pressure fluid (e.g., 30 lbs. of force resulting in high pressure fluid at 150 psi) to the pistons.

Figure 9:
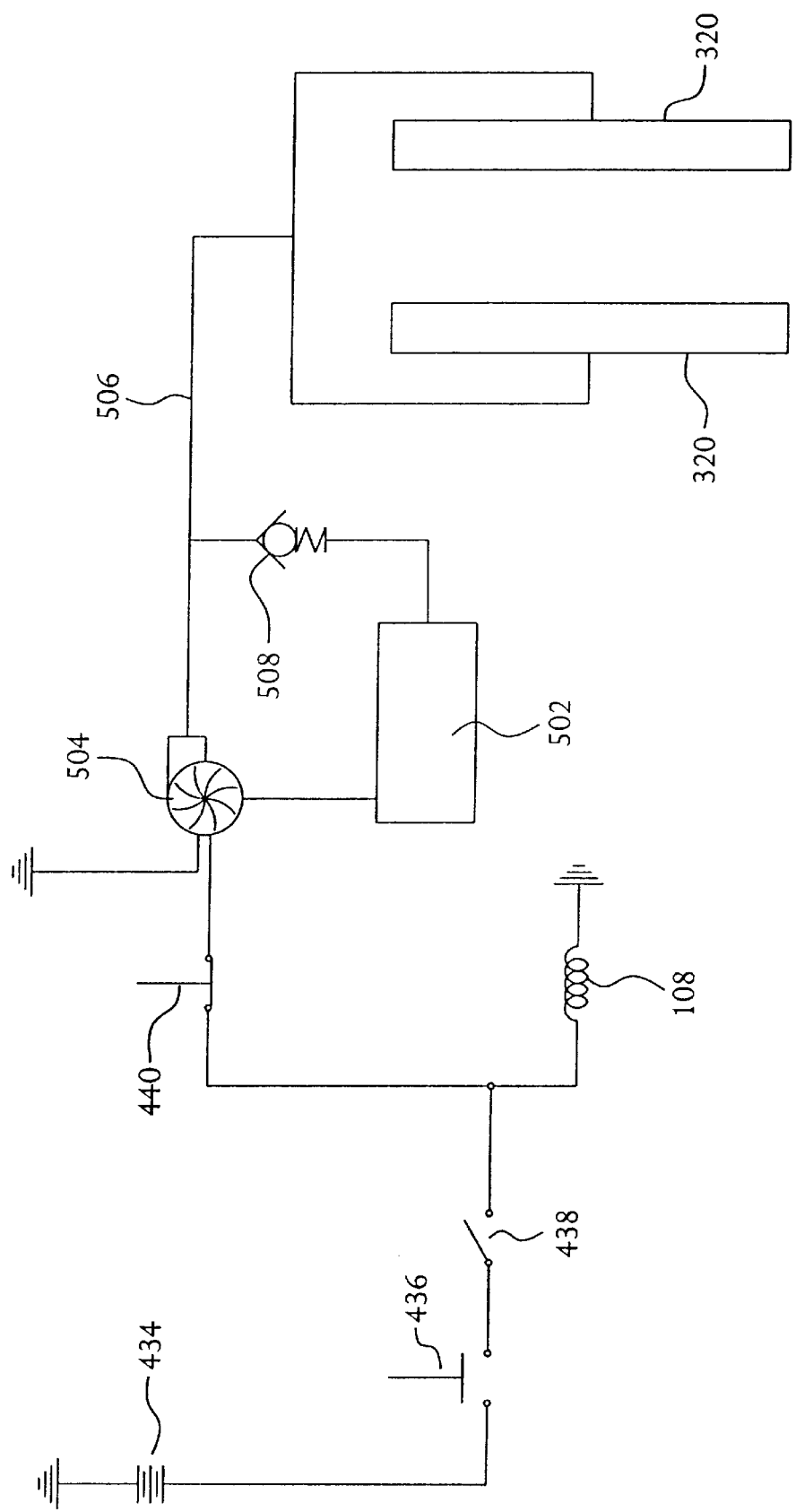
FIG. 9 is a schematic view of an alternate embodiment of a system for controlling the operation of the pistons in the clutch pack assemblies.

The above described mechanical pump system is one type of system for controlling the pressurization of the pistons. An alternate and more preferred system is shown in FIG. 9. In this embodiment, a reservoir 502 supplies fluid to a conventional pump 504 which, in turn, pumps pressurized fluid along a first supply line 506 to the pistons 320 in the clutch packs. A pressure relief valve 508 controls flow of fluid back to the reservoir 502 in case of overpressurization of the fluid.

In order to control the pump 504, power is supplied in a similar manner as described above with respect to FIG. 8B, except the activation switch 440 controls the supplying of power to the pump 504 instead of to solenoids. When the throttle is applied, the switch opens, cutting off power to the pump 504. When the throttle is not applied, for example during deceleration, the switch closes and power is supplied to the pump 504. Other types of systems can be used for controlling flow of fluid to the pistons 320.

Figure 6A:
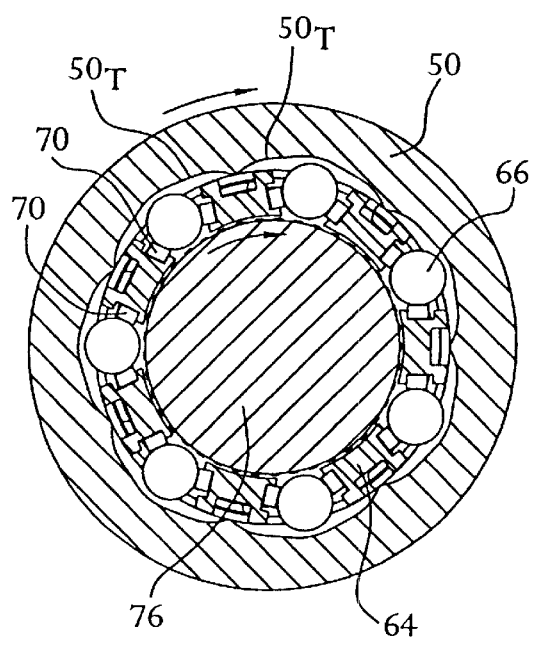
FIG. 6A is a schematic cross-sectional view of a roll cage in a non-activated position.
Figure 6B:
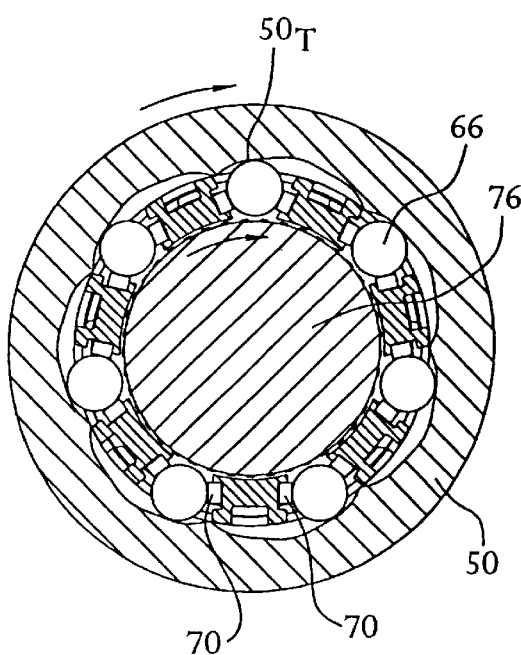
FIG. 6B is a schematic cross-sectional view of the roll cage in a first position.

The operation of the bi-directional overrunning clutch will now be discussed. Under normal operation (two-wheel drive mode), the electronic control system 142 does not send any signals to energize the coil. Accordingly, the vehicle is propelled by the primary drive shaft 14 and primary driven shafts 18, 20. The secondary drive shaft 24 rotates the pinion input shaft 32 which drives the ring gear 48. The ring gear 48 rotates the clutch housing 50 within the differential housing 34. Since the coil is not energized, the springs 70 maintain the roll cage 64 in a relatively central or unengaged position (non-activated position). This position is best illustrated in FIG. 6A. In this position, the rolls 66 are not wedged between the races 76 and the tapered portion $50_T$ of the cam surface of the clutch housing 50 and, therefore, there is no driving engagement between the clutch housing 50 and the races 76. Instead, the rolls 66 and roll cage 64 rotate with the clutch housing 50, independent from the output hubs 78. In this mode of operation, the secondary driven shafts 26, 28 do not drive the wheels.

When it is desired to operate the vehicle such that four wheel drive is available when needed (four-wheel drive capability mode), the electronic control system 142 is activated. Preferably, the activation is provided by manually actuating a button on the vehicle console, although the system can be automatically activated if desired. The electronic control system 142 sends a signal to energize the driving coil 108. The energizing of the driving coil 108 creates an electromagnetic field between the driving coil 108 and the first armature plate 112. The electromagnetic field causes the armature plate 112 to drag or slow in speed. Since the armature plate 112 is engaged to the roll cage 64 by the tangs 114, the electromagnetic field causes the roll cage 64 to slow with respect to the clutch housing 50 into a first position. In this position (shown in FIG. 6B), the rolls 66 are located near to but not wedged between the tapered portion $50_T$ of the cam surface and the races 76. Instead, the difference in rotational speed between the secondary drive shaft 24 and the output hubs 78 maintains the rolls 66 in an overrunning mode. As such, the vehicle continues to operate in two-wheel drive (i.e., driven by the primary drive shaft 14).

Figure 6C:
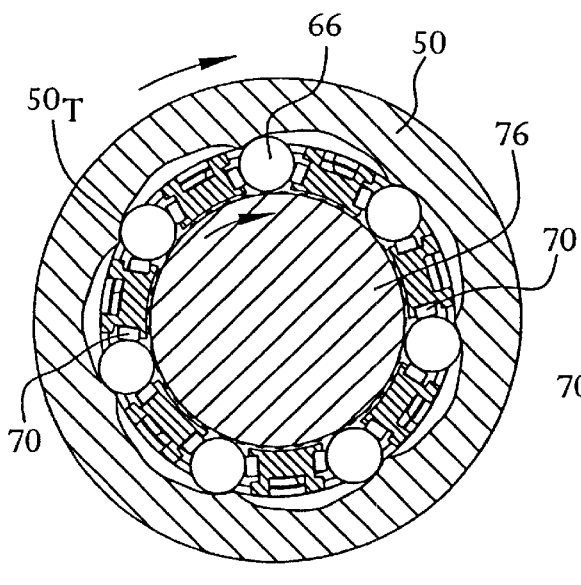
FIG. 6C is a schematic cross-sectional view of the roll cage in an engaged position wherein the pinion input shaft drives the output shafts.
Figure 6D:
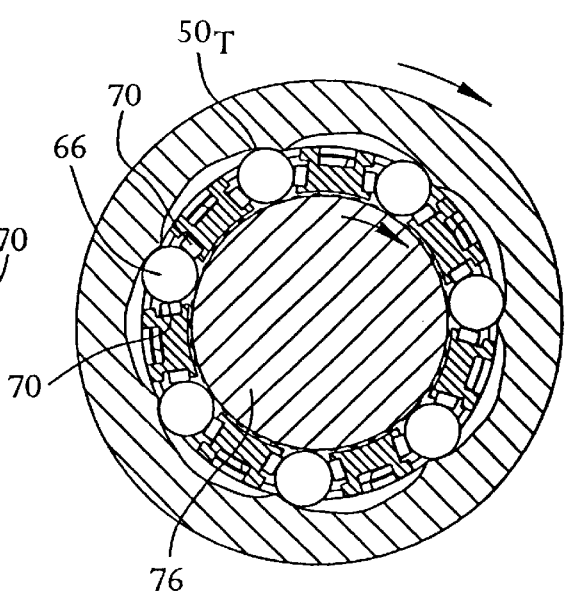
FIG. 6D is a schematic cross-sectional view of the roll cage in a second position wherein the output shafts drive the pinion input shaft.

When the wheels 22 driven by the primary drive shaft 14 begin to slip, the rotational speed of the secondary drive shaft 24 and the output hubs 78 begin to equalize relative to the ground, since ground speed controls four-wheel drive and overrunning engagement. As such, the clutch housing 50 starts to rotate faster than the output hubs 78 and races 76. This change in relative speed between these components causes the rolls 66 to wedge between the races 76 and the tapered portion $50_T$ of the cam surface (as shown in FIG. 6C). As a result, torque is transmitted from the clutch housing 50 to the races 76 and the vehicle is now operating in four-wheel drive (i.e., the primary driven shafts 18, 20 and secondary driven shaft 26, 28 are driving the wheels 22, 30). The drive system will stay in four-wheel drive until the wheels 22 on the primary drive shaft 14 stop slipping, at which point the output hubs 78 once again overrun the clutch housing 50 and the rolls 66 disengage. The ability of the present invention to engage and disengage the secondary driven shafts when needed allows the system to provide immediate four-wheel drive capability in both forward and rear directions.

Another feature of the bi-directional overrunning clutch 10 according to the present invention is that, even when the vehicle is operating in four-wheel drive capability mode, i.e., when torque is transmitted to the secondary driven shafts 26, 28, the sets of rolls 66 can independently disengage (overrun) from the clutch housing 50 when needed, such as when the vehicle enters into a turn and the wheel on one secondary driven shaft 26 rotates at a different speed than the wheel on the other secondary driven shaft 28. As such, the overrunning clutch 10 provides the drive system with the advantages of an open differential in cornering without traction loss, and the advantages of a locking differential when in four-wheel drive without the disadvantages of understeering and tire scuffing when cornering.

The present invention also provides engine braking capability (backdriving mode) for use when driving the vehicle down steep inclines. In the backdriving mode, the secondary driven shafts 26, 28 are engaged with the secondary drive shaft 24 and actually drive the secondary drive shaft 24. This is important since the front wheels generally have better traction than the rear wheels when the vehicle is descending down a steep slope in a forward direction. The present invention takes advantage of this occurrence and engages the front wheels (via the secondary driven shafts 26, 28 and output shafts 78) with the secondary drive shaft 24 (via the clutch housing 50 and pinion input shaft 32) such that front wheels control the rotation of the secondary drive shaft 24. This produces backdrive which uses engine braking to thereby assist in slowing down the vehicle.

The backdriving mode is preferably controlled by the speed of the vehicle. More particularly, as the vehicle decelerates or slows, the hydraulic pump is energized so as to channel pressurized fluid to the pistons. The pressurized fluid actuates the pistons, causing them to compress the clutch pack assemblies 300 (i.e., compressing the friction 304 and drive plates 306). When sufficient pressure is applied, a dynamic torque coupling effect is produced between the clutch housing 50 and the output hubs 76. More particularly, the pressure between the friction plates 304 and the drive plates 306 causes the output hubs 78 to rotate the friction plates 304. Since the friction plates are engaged with the clutch pack housing 302, the clutch pack housing 302 likewise rotates. As discussed above, the clutch pack housing 302 is attached directly to the clutch housing 50 which, in turn, is engaged with the input pinion 32. As such, the rotation of the clutch pack housing 302 produces rotation of the clutch housing 50 and input pinion 32. Thus, the secondary drive shafts 26, 28 drive the input pinion 32.

The pump is preferably wired into the throttle system as discussed above. When the vehicle is accelerating, the pump is switched off. When the throttle is released, the switch is closed, energizing the pump (or, alternately, opening a valve, such as a solenoid valve) to pressurize the clutch pack assemblies. It is also contemplated that the on-off status of the system can be controlled depending on whether the four-wheel drive system is on or off.

Figure 10:
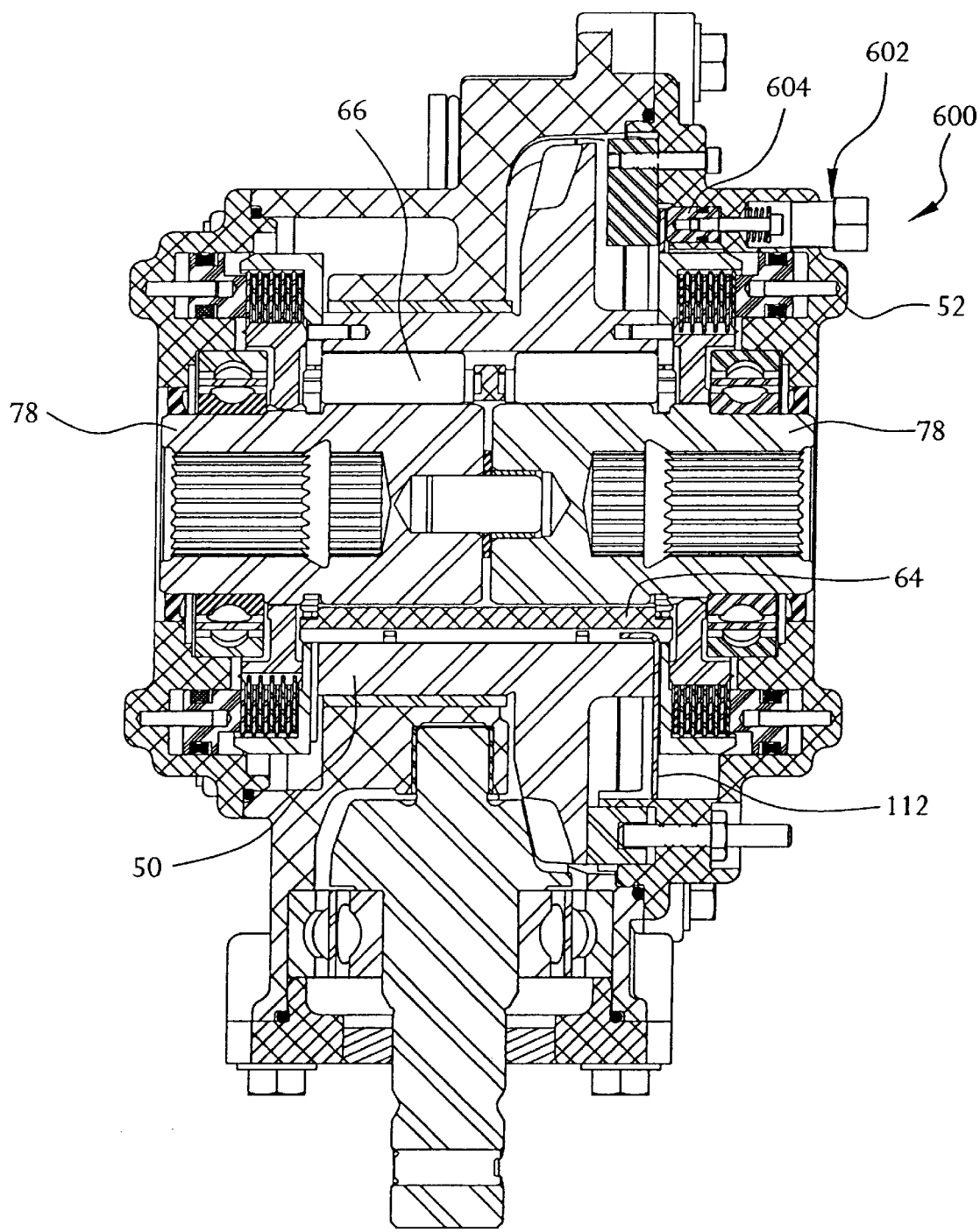
FIG. 10 is a cross-section of an alternate embodiment of the overrunning clutch of FIG. 2 illustrating a hydraulic piston assembly for indexing the roll cage.

Referring now to FIG. 10, an alternate embodiment of the invention is shown in cross-section. In this embodiment, the electromagnetic coil is replaced with a hydraulic piston assembly 600 that engages the roll cage 64 causing it to drag and, thus, place the rolls in position to engage the secondary axles should the primary wheels slip. More particularly, the hydraulic piston assembly 600 includes a piston 602 which is connected to a hydraulic source (not shown). The piston 602 includes a piston head 604 which is slidingly mounted within the right cover plate 52 adjacent to the armature plate 112. A spring 606 biases the piston head 604 away from the armature plate 112. The piston 602 also includes a surface that receives fluid pressure for urging the piston head toward the armature plate 112. Piston assemblies are well known and, therefore, no further discussion is needed.

The operation of this embodiment of the invention is as follows. When it is desired to activate the four wheel drive system (i.e., four wheel drive capability mode), the electronic control system is activated, causing pressurized fluid to flow to the hydraulic piston assembly 600. The pressurized fluid causes the piston head 604 to slide toward and contact the armature plate 112. The contact between the piston head 604 and the armature plate causes the roll cage 64 to drag or index, thus locating the rolls in position to engage the clutch housing 50 with the output hubs 78 should the primary wheels begin to slip. The remainder of the operation of this embodiment of the invention is the same as discussed above.

The present invention provides for improved control during driving since the differential provides dynamic torque which essentially prevents the drive axles from locking with the drive axle. Instead, the differential permits constant slippage to accommodate the speed differential that is designed into the system between the input shaft and the output hubs. In one embodiment, that speed differential is approximately 20%. Thus, the differential permits the output hubs to run at the speed they need to run at. This allows that operator to steer the vehicle much easier as compared with a system that used static torque. Static torque tends to result in the output hubs and secondary shafts locking together, causing the shafts to work like a single axle, making steering extremely difficult.

While the preferred embodiment of the invention contemplates that the backdrive mode will be engaged automatically depending on the vehicle speed, it is also contemplated that there may be embodiments where other types of sensors or a manually engagable switch could be used.

It is also contemplated that the cam surface need not be formed on the clutch housing but, instead, can be formed on the races. Also, the roller clutch described above can be modified to use sprags instead of rolls.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

We claim:

1. A bi-directional overrunning clutch differential for controlling torque transmission between a pinion input shaft and at least one output hub, the differential comprising
   a differential housing;
   a pinion input shaft having an end rotatably disposed within the differential housing;
   at least one output hub having an end rotatably disposed within the differential housing;
   a clutch disposed within the differential housing and adapted to control torque transmission between the pinion input shaft and the at least one output hub, the clutch having a first position wherein the clutch is positioned to engage the pinion input shaft to the at least one output hub to permit torque transmission from the pinion input shaft to the at least one output hub, and a second position wherein the clutch engages the pinion input shaft with the at least one output hub to permit torque transmission from the at least one output shaft to the pinion input shaft, the clutch having a clutch housing;
   an electromagnetic indexing device mounted within the differential housing, the electromagnetic device adapted to place the clutch in its first position when energized; and
   an electrohydraulic device mounted within the differential housing, the electrohydraulic device including a device housing attached to the clutch housing so as to rotate in combination with the clutch housing, at least one drive plate adapted to rotate in combination with the output hub, and a hydraulic piston adapted to engage the drive plate with the device housing when actuated for transmitting dynamic torque from the output hub to the clutch housing through the device housing.

2. A bi-directional overrunning clutch differential according to claim 1 wherein the electrohydraulic device further comprises at least one friction plate located adjacent to the at least one drive plate, the friction plate being engaged to and adapted to rotate in combination with the device housing, and wherein the engagement between the drive plate and the device housing is provided by the hydraulic piston urging the drive plate and friction plates to frictionally engage with one another.

3. A bi-directional overrunning clutch differential according to claim 2 wherein there are a plurality of friction plates and drive plates interleaved with one another and wherein the hydraulic piston urges the friction and drive plates into engagement with each other.

4. A bi-directional overrunning clutch differential according to claim 1 wherein there are two output hubs, the differential further comprising a second electrohydraulic device mounted within the differential housing, the electrohydraulic device including a device housing attached to the clutch and adapted to rotate in combination with the clutch, at least one drive plate adapted to rotate in combination with the output hub, and a hydraulic piston adapted to engage the drive plate with the device housing when actuated, and wherein the at least one drive plate in each electrohydraulic device engages with one of the output hubs.

5. A bi-directional overrunning clutch differential according to claim 4 wherein the differential is mounted to a vehicle, the vehicle including a primary drive axle, a secondary drive axle with two half shafts, each half shaft having one end engaged with a wheel and the opposite end engaged with an output hub, and a control system adapted to supply pressurized fluid to the hydraulic pistons in each electrohydraulic device when the vehicle is decelerating.

6. A bi-directional overrunning clutch differential according to claim 1 wherein the clutch includes a clutch housing and a roll cage, and wherein the electromagnetic indexing device includes a coil which when energized drags the roll cage with respect to the clutch housing.

7. A bi-directional overrunning clutch differential according to claim 6 wherein the electromagnetic indexing device further includes an armature plate for engaging the roll cage, the energizing of the coil adapted to cause the armature plate to drag the roll cage.

8. A bi-directional overrunning clutch differential according to claim 1 wherein the clutch is mounted to a vehicle, the vehicle including a drive shaft and two half shafts, each half shaft having a wheel engaged therewith, the overrunning clutch including two output hubs, each output hub being rotatably engaged with a half shaft, the pinion input shaft being rotatably engaged with the drive shaft, and an electronic control system for controlling the electromagnetic indexing device and the electrohydraulic device.

9. A bi-directional overrunning clutch differential according to claim 3 wherein the clutch includes a clutch housing and a roll cage, and wherein the electromagnetic indexing device includes a coil which when energized drags the roll cage with respect to the clutch housing.

10. A bi-directional overrunning clutch differential according to claim 3 wherein the engagement between the drive plates and the output hub is through an adapter ring, the adapter ring being splined to the output hub and the drive plate.

11. A bi-directional overrunning clutch assembly comprising:
    a differential housing;
    a pinion input shaft having an end rotatably disposed within the differential housing;
    a clutch housing disposed within the differential housing and rotatably connected to the pinion input shaft, the clutch housing having an inner surface;
    at least one race disposed adjacent to the inner surface of the clutch housing;
    a cage disposed between the at least one race and the inner surface of the clutch housing, the cage having a plurality of slots formed in and spaced circumferentially about the cage, each slot having a roll located therein, the cage being adjustable with respect to the clutch housing and the at least one race;
    an armature plate located adjacent to and adapted to engage with the cage;
    an indexing device mounted within the differential housing adjacent to the armature plate, the indexing device adapted to engage the armature plate when activated to hinder rotation of the armature plate and cause the cage to move to a first position with respect to the clutch housing, the first position of the cage locating the rolls so as to be adapted to wedge between the inner surface and the at least one race when the clutch housing is rotating faster than the at least one race; and
    an electrohydraulic device mounted within the differential housing, the electrohydraulic device including a device housing attached to the clutch housing and adapted to rotate in combination with the clutch housing, at least one drive plate adapted to rotate in combination with the output hub, and a hydraulic piston adapted to engage the drive plate with the device housing when actuated.

12. An overrunning clutch according to claim 11 wherein the indexing device is a hydraulic piston assembly which includes a piston that contacts the armature when activated causing the armature plate to index the cage to the first position.

13. An overrunning clutch according to claim 12 wherein there are two races, each race formed on a separate output hub and located adjacent to a portion of the inner surface of the clutch housing; wherein the cage is disposed about both races and the plurality of slots are arranged in two sets such that each set of slots has a set of rolls located therein between the inner surface and one of the races, the cage being adjustable with respect both races; and wherein the first position of the cage locates the rolls so that each set of rolls is independently adapted to wedge between the inner surface and an associated race when the clutch housing is rotating faster than the associated race.

14. A bi-directional overrunning clutch according to claim 11 wherein the roll cage floats freely between the inner surface of the clutch housing and the at least one race.

15. A bi-directional overrunning clutch assembly comprising:
a differential housing;
a pinion input shaft having an end rotatably disposed within the differential housing;
a clutch housing disposed within the differential housing and rotatably connected to the pinion input shaft, the clutch housing having an inner surface;
at least one race disposed adjacent to the inner surface of the clutch housing;
a cage disposed between the at least one race and the inner surface of the clutch housing, the cage having a plurality of slots formed in and spaced circumferentially about the cage, each slot having a roll located therein, the cage being adjustable with respect to the clutch housing and the at least one race;
an armature plate located adjacent to and adapted to engage with the cage;
an indexing device mounted within the differential housing adjacent to the armature plate, the indexing device adapted to engage the armature plate when activated to hinder rotation of the armature plate and cause the cage to move to a first position with respect to the clutch housing, the first position of the cage locating the rolls so as to be adapted to wedge between the inner surface and the at least one race when the clutch housing is rotating faster than the at least one race; and
an electrohydraulic device mounted within the differential housing, the electrohydraulic device including a device housing attached to the clutch housing and adapted to rotate in combination with the clutch housing, at least one drive plate adapted to rotate in combination with the output hub, and a hydraulic piston adapted to engage the drive plate with the device housing when actuated;
wherein each roll is biased into a neutral position by springs located on either side, and wherein each spring is engaged to a spring in an adjacent slot by a bridge, the bridge supporting the springs within the slots.

16. A bi-directional overrunning clutch according to claim 11 wherein the indexing device includes a coil which generates a magnetic field when activated that causes the armature plate to index the roll cage.

17. A bi-directional overrunning clutch according to claim 11 wherein the electrohydraulic device further comprises at least one friction plate located adjacent to the at least one drive plate, the friction plate being engaged to and adapted to rotate in combination with the device housing, and wherein the engagement between the drive plate and the device housing is provided by the hydraulic piston urging the drive plate and friction plates to frictionally engage with one another.

18. A bi-directional overrunning clutch according to claim 17 wherein there are a plurality of friction plates and drive plates interleaved with one another and wherein the hydraulic piston urges the friction and drive plates into engagement with each other.

19. An overrunning clutch assembly comprising:
a differential housing;
a pinion input shaft having an end rotatably disposed within the differential housing;
a clutch housing disposed within the differential housing and rotatably connected to the pinion input shaft, the clutch housing having an inner surface;
a first race located adjacent to a portion of the inner surface of the clutch housing, the first race being located on a first output hub;
a second race disposed adjacent to a portion of the inner surface of the clutch housing, the second race being located on a second output hub, the second output hub being axially aligned with the first output hub;
a cage disposed between the first and second races and the inner surface of the clutch housing, the cage having a two sets of slots formed in and spaced circumferentially about the cage, each slot having a roll located therein such that there are two sets of rolls in the cage, one set of rolls being disposed about each race, the cage being adjustable with respect to the clutch housing and the races;
an armature plate located adjacent to and adapted to engage with the cage;
an indexing device mounted within the differential housing adjacent to the armature plate, the indexing device adapted to engage the armature plate when activated to hinder rotation of the armature plate and cause the cage to move to a first position with respect to the clutch housing, the first position of the cage locating both sets of rolls such that each set of rolls is independently adapted to wedge between the inner surface and an associated race when the clutch housing is rotating faster than the associated race;
a first electrohydraulic device mounted within the differential housing, the first electrohydraulic device including a first device housing attached to the clutch housing and adapted to rotate in combination with the clutch housing, at least one drive plate adapted to rotate in combination with the first output hub, and a hydraulic piston adapted to engage the drive plate with the first device housing when actuated; and
a second electrohydraulic device mounted within the differential housing on the opposite side of the clutch housing from the first electrohydraulic device, the second electrohydraulic device including a second device housing attached to the clutch housing and adapted to rotate in combination with the clutch housing, at least one drive plate adapted to rotate in combination with the second output hub, and a hydraulic piston adapted to engage the drive plate with the second device housing when actuated.

20. An overrunning clutch according to claim 19 wherein the indexing device is a hydraulic piston assembly which includes a piston that contacts the armature plate when activated causing the armature plate to drag the cage to the first position.

21. An overrunning clutch according to claim 19 wherein the indexing device is a electrically controlled coil that causes the armature plate to drag when activated and thereby index the cage to the first position.

22. An overrunning clutch according to claim 19 wherein the roll cage floats freely between the inner surface of the clutch housing and the at least one race.

23. An overrunning clutch assembly comprising:

a differential housing;

a pinion input shaft having an end rotatably disposed within the differential housing;

a clutch housing disposed within the differential housing and rotatably connected to the pinion input shaft, the clutch housing having an inner surface;

a first race located adjacent to a portion of the inner surface of the clutch housing, the first race being located on a first output hub;

a second race disposed adjacent to a portion of the inner surface of the clutch housing, the second race being located on a second output hub, the second output hub being axially aligned with the first output hub;

a cage disposed between the first and second races and the inner surface of the clutch housing, the cage having a two sets of slots formed in and spaced circumferentially about the cage, each slot having a roll located therein such that there are two sets of rolls in the cage, one set of rolls being disposed about each race, the cage being adjustable with respect to the clutch housing and the races;

an armature plate located adjacent to and adapted to engage with the cage;

an indexing device mounted within the differential housing adjacent to the armature plate, the indexing device adapted to engage the armature plate when activated to hinder rotation of the armature plate and cause the cage to move to a first position with respect to the clutch housing, the first position of the cage locating both sets of rolls such that each set of rolls is independently adapted to wedge between the inner surface and an associated race when the clutch housing is rotating faster than the associated race;

a first electrohydraulic device mounted within the differential housing, the first electrohydraulic device including a first device housing attached to the clutch housing and adapted to rotate in combination with the clutch housing, at least one drive plate adapted to rotate in combination with the first output hub, and a hydraulic piston adapted to engage the drive plate with the first device housing when actuated; and a second electrohydraulic device mounted within the differential housing, the second electrohydraulic device including a second device housing attached to the clutch housing and adapted to rotate in combination with the clutch housing, at least one drive plate adapted to rotate in combination with the second output hub, and a hydraulic piston adapted to engage the drive plate with the second device housing when actuated;

wherein each roll is biased into a neutral position by springs located on either side, and wherein each spring is engaged to a spring in an adjacent slot by a bridge, the bridge supporting the springs within the slots.

24. An overrunning clutch according to claim 19 wherein each electrohydraulic device further comprises at least one friction plate located adjacent to the at least one drive plate, the friction plate being engaged to and adapted to rotate in combination with the device housing, and wherein the engagement between the drive plate and the device housing is provided by the hydraulic piston urging the drive plate and friction plates to frictionally engage with one another.

25. An overrunning clutch according to claim 24 wherein each electrohydraulic device includes a plurality of friction plates and drive plates interleaved with one another and wherein the hydraulic piston urges the friction and drive plates into engagement with each other.

26. An overrunning clutch assembly comprising:

a differential housing;

a pinion input shaft having an end rotatably disposed within the differential housing;

a clutch housing disposed within the differential housing and rotatably connected to the pinion input shaft, the clutch housing having an inner surface;

a first race located adjacent to a portion of the inner surface of the clutch housing, the first race being located on a first output hub;

a second race disposed adjacent to a portion of the inner surface of the clutch housing, the second race being located on a second output hub, the second output hub being axially aligned with the first output hub;

a cage disposed between the first and second races and the inner surface of the clutch housing, the cage having a two sets of slots formed in and spaced circumferentially about the cage, each slot having a roll located therein such that there are two sets of rolls in the cage, one set of rolls being disposed about each race, the cage being adjustable with respect to the clutch housing and the races;

an armature plate located adjacent to and adapted to engage with the cage;

a coil mounted within the differential housing adjacent to the armature plate, the coil adapted when energized to hinder rotation of the armature plate and cause the cage to move to a first position with respect to the clutch housing, the first position of the cage locating both sets of rolls such that each set of rolls is independently adapted to wedge between the inner surface and an associated race when the clutch housing is rotating faster than the associated race;

a first hydraulic clutch pack mounted within the differential housing, the first hydraulic clutch pack including a first clutch pack housing attached to the clutch housing and adapted to rotate in combination with the clutch housing, a plurality of drive plates engaged with the first output hub, a plurality of friction plates engaged to and adapted to rotate in combination with the first clutch pack housing, the friction plates and drive plates being interweaved with each other, and a hydraulic piston adapted when actuated to urge the drive plates and friction plates into contact with one another for transmitting torque between the plates; and a second hydraulic clutch pack mounted within the differential housing on the opposite side of the clutch housing from the first hydraulic clutch pack, the second hydraulic clutch pack including a second clutch pack housing attached to the clutch housing and adapted to rotate in combination with the clutch housing, a plurality of drive plates engaged with the second output hub, a plurality of friction plates engaged to and adapted to rotate in combination with the second clutch pack housing, the friction plates and drive plates being interweaved with each other, and a hydraulic piston adapted when actuated to urge the drive plates and friction plates into contact with one another for transmitting torque between the plates.

27. A bi-directional overrunning clutch differential or controlling torque transmission between a pinion input shaft and two output hubs, the differential comprising
a differential housing;
a pinion input shaft having an end rotatably disposed within the differential housing;
two output hubs having an end rotatably disposed within the differential housing;
a clutch disposed within the differential housing and adapted to control torque transmission between the pinion input shaft and the output hubs, the clutch including a clutch housing and a roller cage assembly located within the clutch housing, the roller cage assembly intermittently transmitting torque from the pinion input shaft to the output hubs;
an electromagnetic indexing device mounted within the differential housing, the electromagnetic device adapted when energized to cause the roller cage assembly to position a set of rollers so as to engage an output hub to the clutch housing when the output hub is rotating above a predetermined speed with respect to the input shaft, the wedging providing torque transmission from the pinion input shaft to the output hub; and
at least two electrohydraulic clutches mounted within the differential housing and adapted to provide torque transmission from the output hubs to the pinion input shaft, each electrohydraulic device including a driven housing attached to the clutch housing and adapted to rotate in combination with the clutch housing, at least one drive plate engaged with one of the output hub for rotating in combination with the output hub, and a hydraulic piston adapted to urge the drive plate into engagement with the device housing when actuated, the engagement between the drive plate and the device housing providing torque transmission from the output hub to the clutch housing when the output hub is rotating above a predetermined speed relative to the input shaft regardless of the engagement of the roller clutch assembly.

28. A bi-directional overrunning clutch differential according to claim 27 wherein the predetermined speed differential relative to the input shaft is approximately 20%.

29. A bi-directional overrunning clutch differential according to claim 5 wherein the control system includes a controller for controlling the supply of hydraulic fluid to the electrohydraulic device, the controller being engaged with a throttle assembly in the vehicle, the engagement designed to supply hydraulic fluid to the electrohydraulic device in response to a deceleration.

30. A system for controlling torque transmission in a vehicle comprising the steps of:

providing a throttle in the vehicle for commanding acceleration;
providing a bi-directional overrunning clutch differential including:
a differential housing,
a pinion input shaft having an end rotatably disposed within the differential housing,
two output hubs having an end rotatably disposed within the differential housing,
a clutch disposed within the differential housing and adapted to control torque transmission between the pinion input shaft and the output hubs, the clutch including a clutch housing and a roller cage assembly located within the clutch housing, the roller cage assembly intermittently transmitting torque from the pinion input shaft to the output hubs,
an electromagnetic indexing device mounted within the differential housing, the electromagnetic device adapted when energized to cause the roller cage assembly to position a set of rollers so as to engage an output hub to the clutch housing when the output hub is rotating above a predetermined speed with respect to the input shaft, the wedging providing torque transmission from the pinion input shaft to the output hub, and
two electrohydraulic clutches mounted within the differential housing and adapted to provide torque transmission from the output hubs to the pinion input shaft, each electrohydraulic device including a driven housing attached to the clutch housing and adapted to rotate in combination with the clutch housing, at least one drive plate engaged with one of the output hub for rotating in combination with the output hub, and a hydraulic piston adapted to urge the drive plate into engagement with the device housing when actuated, the engagement between the drive plate and the device housing providing torque transmission from the output hub to the clutch housing when the output hub is rotating above a predetermined speed with respect to the input shaft regardless of the engagement of the roller clutch assembly;
activating the electromagnetic indexing device, the activation causing the roller cage assembly to reposition a set of rollers so as to wedge the rollers between an output hub and the clutch housing when the output hub is rotating faster than the clutch housing, the wedging providing torque transmission from the pinion input shaft to the output hub;
sensing a position of the throttle indicative of a deceleration of the vehicle; and
activating the hydraulic pistons in the electrohydraulic clutches, the activation of each piston urging the associated drive plate into dynamic engagement with the device housing, the dynamic engagement between the drive plate and the device housing permitting slippage between the drive plate and the device housing while providing torque transmission from the output hub to the clutch housing when the output hub is rotating above a predetermined speed relative to the input shaft.

* * * * *